US010030084B2

(12) United States Patent
Ioannidis et al.

(10) Patent No.: US 10,030,084 B2
(45) Date of Patent: Jul. 24, 2018

(54) TIN-FREE CATALYST-CONTAINING COMPOSITION FOR A MONOSIL PROCESS WITH OPTIMIZED PROCESS PROPERTIES

(71) Applicant: EVONIK DEGUSSA GmbH, Essen (DE)

(72) Inventors: Aristidis Ioannidis, Rheinfelden (DE); Ioana-Elena Mihailescu, Rheinfelden (DE); Bastian Bielawski, Rheinfelden (DE); Helmut Mack, Traunstein (DE); Kerstin Weissenbach, Gengenbach (DE)

(73) Assignee: EVONIK DEGUSSA GMBH, Essen (DE)

( * ) Notice: Subject to any disclaimer, the term of this patent is extended or adjusted under 35 U.S.C. 154(b) by 216 days.

(21) Appl. No.: 14/912,710

(22) PCT Filed: Jul. 29, 2014

(86) PCT No.: PCT/EP2014/066297
§ 371 (c)(1),
(2) Date: Feb. 18, 2016

(87) PCT Pub. No.: WO2015/024744
PCT Pub. Date: Feb. 26, 2015

(65) Prior Publication Data
US 2016/0200843 A1 Jul. 14, 2016

(30) Foreign Application Priority Data

Aug. 21, 2013 (DE) .................. 10 2013 216 504

(51) Int. Cl.
| | |
|---|---|
| *C08F 210/02* | (2006.01) |
| *B29C 47/00* | (2006.01) |
| *C08K 5/00* | (2006.01) |
| *C08K 5/09* | (2006.01) |
| *C08K 5/5419* | (2006.01) |
| *C08K 5/5425* | (2006.01) |
| *B29K 23/00* | (2006.01) |

(Continued)

(52) U.S. Cl.
CPC ........ *C08F 210/02* (2013.01); *B29C 47/0004* (2013.01); *C08K 5/005* (2013.01); *C08K 5/0025* (2013.01); *C08K 5/09* (2013.01); *C08K 5/5419* (2013.01); *C08K 5/5425* (2013.01); *B29K 2023/00* (2013.01); *B29L 2031/00* (2013.01); *C08K 5/14* (2013.01)

(58) Field of Classification Search
CPC ................. C08L 23/06; C08K 5/5425
See application file for complete search history.

(56) References Cited

U.S. PATENT DOCUMENTS

| | | |
|---|---|---|
| 6,395,837 B1 | 5/2002 | Blank et al. |
| 6,441,097 B1 | 8/2002 | Blank et al. |
| 6,864,323 B2 | 3/2005 | Schlosser et al. |

(Continued)

FOREIGN PATENT DOCUMENTS

| | | | |
|---|---|---|---|
| DE | 10 2008 041 918 A1 | | 3/2010 |
| EP | 426073 A2 | * | 5/1991 |

(Continued)

OTHER PUBLICATIONS

International Search Report and Written Opinion dated Sep. 24, 2014 in PCT/EP2014/066297.
Charles Maillefer, et al., "Monosil: The one step process of mixing and extruding crosslinkable polyolefins" Technical Papers, Regional Technical Conference—Society of Plastics Engineers, XP009179981, 2006, pp. 12-24.
U.S. Appl. No. 10/588,850, filed May 17, 2017, US 2008/0027161 A1, Thomas Schlosser, et al.
U.S. Appl. No. 13/058,290, filed Feb. 9, 2011, US 2011/0144277 A1, Kerstin Weissenbach, et al.

(Continued)

*Primary Examiner* — Mark S Kaucher
(74) *Attorney, Agent, or Firm* — Grüneberg and Myers PLLC

(57) ABSTRACT

The invention relates to a composition for use in a Monosil process for the crosslinking of thermoplastic polyolefins which comprises
(i) from 5 to 60% by weight content of 2-ethyl hexanoic acid [$H_3C(CH_2)_3CH(C_2H_5)COOH$],
(ii) content of at least one monounsaturated organofunctional alkoxysilane of the general formula I $$A\text{-}SiR^2_x(OR^1)_{3-x} \qquad (I),$$

where
$R^1$ is mutually independently a linear or branched hydrocarbon moiety having from 1 to 4 C atoms,
$R^2$ is methyl and x is 0 or 1 and
A is a monovalent olefin group of the formula $(R^3)_2C=C(R^3)\text{-}M_k\text{-}$, where k is 0 or 1, in which groups $R^3$ are identical or different and $R^3$ is a hydrogen atom or a methyl group and the group M is a group from the following list: $-CH_2-$, $-(CH_2)_2-$, $-(CH_2)_3-$ and $-C(O)O-(CH_2)_3-$,
(iii) content of at least one free-radical generator and
(iv) optionally content of at least one other component, where the entirety of all components (i) to (iv) gives 100% by weight.
The present invention further relates to a production process, and also to moldings or products obtainable thereby based on thermoplastic polyolefins, where a composition of the invention is reacted together with at least one thermoplastic polyolefin in a Monosil process. The invention further relates to the use of a composition of the invention in the Monosil process for the crosslinking of thermoplastic polyolefins during the production of products molded by means of extrusion, based on thermoplastic polyolefins.

14 Claims, No Drawings

(51) Int. Cl.
*B29L 31/00* (2006.01)
*C08K 5/14* (2006.01)

(56) References Cited

U.S. PATENT DOCUMENTS

| | | |
|---|---|---|
| 9,108,992 B2 | 8/2015 | Weissenbach et al. |
| 9,273,186 B2 | 3/2016 | Standke et al. |
| 2009/0247712 A1 | 10/2009 | Tanaka et al. |
| 2011/0144278 A1 | 6/2011 | Weissenbach et al. |
| 2013/0253144 A1 | 9/2013 | Weissenbach et al. |

FOREIGN PATENT DOCUMENTS

| | | |
|---|---|---|
| EP | 2 080 777 A1 | 7/2009 |
| JP | 2006-052353 | 2/2006 |
| JP | 2006-52353 A | 2/2006 |

OTHER PUBLICATIONS

U.S. Appl. No. 13/059,546, filed Feb. 17, 2011, US 2011/0144278 A1, Kerstin Weissenbach, et al.
U.S. Appl. No. 13/903,594, filed May 28, 2013, US 2013/0253144 A1, Kirsten Weissenbach, et al.
U.S. Appl. No. 13/062,225, filed May 16, 2011, US 2011/0282024 A1, Kerstin Weissenbach, et al.
U.S. Appl. No. 13/061,451, filed Feb. 28, 2011, US 2012/0065302 A1, Kerstin Weissenbach, et al.
U.S. Appl. No. 14/360,120, filed May 22, 2014, US 2014/0296555 A1, Burkhard Standke, et al.
U.S. Appl. No. 14/360,114, filed May 22, 2014, US 2015/0080531 A1, Burkhard Standke, et al.

* cited by examiner

TIN-FREE CATALYST-CONTAINING COMPOSITION FOR A MONOSIL PROCESS WITH OPTIMIZED PROCESS PROPERTIES

This application is a National Stage entry under § 371 of International Application No. PCT/EP2014/066297, filed on Jul. 29, 2014, and which claims the benefit of German Application No. 10 2013 216 504.8, filed on Aug. 21, 2013.

The invention relates to a specific composition for use in a Monosil process for the crosslinking of thermoplastic polyolefins, where the composition comprises content of 2-ethylhexanoic acid [$H_3C(CH_2)_3CH(C_2H_5)COOH$], content of at least one monounsaturated organofunctional alkoxysilane and content of at least one free-radical generator. The present invention further relates to a process for the production of silane-crosslinked mouldings or products based on thermoplastic polyolefins with use of the selected composition in a Monosil process.

It is known that organotin compounds or aromatic sulphonic acids (Ambicat™ from Borealis) can be used as silanol-condensation catalysts for the crosslinking of silane-grafted or silane-copolymerized polyethylenes to produce filled and unfilled compounded polymer materials, in particular polyethylene (PE) and copolymers thereof.

An example of a method that can be used is the Sioplas process. This is a two-step process. The first step produces a compounded polymer material, and in essence here the thermoplastic polymer is grafted with addition of a mixture of a monounsaturated organoalkoxysilane, such as vinyltrialkoxysilane, and of a free-radical generator. A compounded polymer material thus obtained can be moulded in a second step with addition of a hydrolysis and condensation catalyst, generally an organotin compound, by means of extrusion to give a moulding, such as a pipe or a cable, and can then be crosslinked with exposure to moisture.

It is equally possible to produce a moulded product based on a thermoplastic polymer in a single-step process known as the Monosil process. The method here is in essence that the thermoplastic polymer is reacted in a heated screw-based extruder with addition of a mixture of a monounsaturated organoalkoxysilane, such as vinyltrialkoxysilane, of a free-radical generator and of a hydrolysis and condensation catalyst, such as an organotin compound, and is moulded, and the moulding is then crosslinked with exposure to moisture, for example in a water bath.

In both of the abovementioned processes it is possible to use further additions or additives, such as fillers, pigments, antioxidants, metal deactivators, UV stabilizers, colorant components, other processing aids or processing materials, for example monomeric organoalkoxysilanes or oligomeric alkyl- and/or vinyl-functional alkoxysiloxanes, for example as water scavengers or as what are known as "scorch retarders", an example being vinyltrimethoxysilane, vinyltriethoxysilane, octyltrimethoxysilane or octyltriethoxysilane or hexadecyltrimethoxysilane or hexadecyltriethoxysilane or octyl/methoxysiloxanes or octyl/ethoxysiloxanes or vinyl/methoxysiloxanes or vinyl/ethoxysiloxanes or octyl/vinyl/methoxysiloxanes or octyl/vinyl/ethoxysiloxanes, etc.

However, a disadvantage of the organotin compounds is that they are significantly toxic, while the sulphonic acids have a noticeable pungent odour which continues through all stages of the process into the final product. Because of by-products resulting from the reaction, the compounded polymer materials crosslinked with sulphonic acids are generally not suitable for use in the food sector or in the sector of drinking-water supply, for example for the production of drinking-water pipes. Conventional tin-containing silanol-condensation catalysts are dibutyltin dilaurate (DBTDL) and dioctyltin dilaurate (DOTL), which act as catalyst by way of their coordination sphere.

It is therefore known that moisture-crosslinkable polymers can be produced by grafting silanes onto polymer chains in the presence of free-radical generators and, after shaping, carrying out the moisture-crosslinking process in the presence of the silane-hydrolysis catalyst and/or silanol-condensation catalysts mentioned. Moisture-crosslinking of polymers with hydrolysable unsaturated silanes is used worldwide for the production of cables, pipes, foams, etc. Processes of this type are known under the names Sioplas process (DE 19 63 571 C3, DE 21 51 270 C3, U.S. Pat. No. 3,646,155) and Monosil process (DE 25 54 525 C3, U.S. Pat. No. 4,117,195). Whereas in the Monosil process the crosslinking catalyst is added in the first processing step, in the Sioplas process the addition of the crosslinking catalyst is delayed to the subsequent step. It is also possible to copolymerize vinyl-functional silanes together with the monomers and/or prepolymers directly to give the parent polymer, or to couple them to the polymer chains by what is known as grafting.

EP 207 627 A discloses further tin-comprising catalyst systems and thus modified copolymers based on the reaction of dibutyltin oxide with ethylene-acrylic acid copolymers. JP 58013613 uses $Sn(acetyl)_2$ as catalyst, and JP 05162237 teaches the use of tin carboxylates, zinc carboxylates or cobalt carboxylates together with bonded hydrocarbon groups as silanol-condensation catalysts, an example being dioctyltin maleate, monobutyltin oxide, dimethyloxybutyltin or dibutyltin diacetate. JP 3656545 uses zinc and aluminium soaps, for example zinc octylate and aluminium laurate for the crosslinking reaction. For the crosslinking of silanes, JP 1042509 likewise discloses the use of organotin compounds, but also alkyl titanates based on titanium-chelate compounds. JP 09-040713 discloses the production of polyolefins modified with silanes by means of reaction of a polyolefin and of two modified silane compounds with use of an organic acid as silanol-condensation catalyst.

WO 2010/028876 A1 is in essence directed to the metal-free, in particular tin-free, provision of thermoplastic products, and discloses very comprehensively a composition of a monounsaturated silane compound and of an organic acid, in particular saturated or unsaturated fatty acids, or of a compound that is a precursor of an organic acid and that liberates an acid, and processes for the production of compounded polymer materials, such as granulated materials and/or finished products, from thermoplastic parent polymers and/or from monomers and/or from prepolymer of the thermoplastic parent polymers with use of the composition, of the organic acid or of the compound that is a precursor and that liberates the said acid. WO 2010/028876 A1 moreover discloses the following materials thus produced, polymers, filled plastics, for example as granulate, finished product or moulding and/or items such as pipes or cables. A kit comprising a composition mentioned in that document is moreover disclosed. The said teaching is preferably directed to Sioplas processes, as can be seen from the Examples of WO 2010/028876 A1. Furthermore, butyric acid and caprylic acid are highlighted as unsuitable because of their pungent odour, in particular for drinking-water pipes. The person skilled in the art will also exclude shorter-chain carboxylic acids because of their corrosivity. According to the teaching of WO 2010/028876 A1 it is advantageous to use capric acid, lauric acid, myristic acid and behenic acid; in relation to myristic acid cf. also EP 2 465 897 B1.

The silane preparation used in the Monosil process, made of a monounsaturated organoalkoxysilane, of a free-radical generator and of a hydrolysis and condensation catalyst, is subject to specific requirements imposed by users to the effect that the said silane preparation (for which the abbreviated silane mixture or mixture or composition will also be used below) is a homogeneous clear liquid and at what is considered to be a "winter" temperature for temperate latitudes, in particular in the frost-free region around 6° C., is a single-phase material, i.e. does not separate, and has a shelf life of 6 months at room temperature, and avoids any sedimentation or precipitation of components even when stored at relatively low temperatures. With a view to the ratios of starting materials in the Monosil process, the mixture should moreover comprise content of at least 3% by weight of hydrolysis and condensation catalyst, so that it can ensure that crosslinking within the product is sufficient to give a desired product quality.

It was an object of the present invention to discover and provide a composition that is specifically suitable for the Monosil process and that comprises at least one monounsaturated organoalkoxysilane, at least one free-radical generator and at least one tin-free hydrolysis or crosslinking catalyst, in particular from the group of the organic acids, and that moreover complies with the requirements mentioned in relation to the Monosil process, so that it can produce, in a very simple and cost-effective manner, tin-free products based on thermoplastic polyolefins by the Monosil process in high quality, in particular for cable applications.

The object is achieved via the composition of the invention corresponding to the features of Claim 1, the process of the invention with the features of Claim 12, and the products of the invention corresponding to the features of Patent Claim 14, and also via the use according to Claim 15. Preferred embodiments can be found in the dependent claims and in the description.

It has therefore been found, surprisingly, that 2-ethylhexanoic acid [$H_3C(CH_2)_3CH(C_2H_5)COOH$] is soluble at high proportions of up to 60% by weight in a monounsaturated organofunctional alkoxysilane, in particular in vinyltrimethoxysilane (VTMO), vinyltriethoxysilane (VTEO) and 3-methacryloxypropyltrimethoxysilane (MEMO), and has a shelf life of at least 6 months, and that this type of solution avoids any precipitation even when the storage temperature is in the region of 6° C. It has moreover been found that content of 2-ethylhexanoic acid of up to 60% by weight in VTMO, VTEO and MEMO remains in solution even after 18 hours at 1° C. In contrast to this, myristic acid, which is highlighted as preferred in EP 2 465 897 B1, unfortunately exhibits considerable precipitation at proportions as low as 7.8% by weight in vinyltrimethoxysilane at a storage temperature of 6° C.; the solution properties of longer-chain fatty acids, for example lauric acid and behenic acid, are therefore likely to be at least as poor as those of myristic acid. Another advantage provided by 2-ethylhexanoic acid in contrast to capric acid is that at room temperature it is a liquid (melting point −59° C.) which is very easy to handle, preferably during conveying and metering, during everyday operations, and even when operating temperatures are very low. In contrast, capric acid, with a melting point of >31° C., would present complicated challenges to handling in everyday production operations. In order to ensure that capric acid can be metered as a liquid, it would have to be kept permanently liquid by heating, with high energy cost. This applies not only to the actual container but also to all feed lines and pumps which come into contact with the capric acid. Another possibility would be addition of capric acid as solid. In that case, the dimensional stability of capric acid would have to be ensured by permanent cooling below the melting point. Again, this procedure for ensuring the flowability of the solid uses large quantities of energy and technical resources and is rather impracticable; by way of example, all of the conveying equipment would have to be permanently cooled. Another difficulty is the solubility of capric acid in vinyltrimethoxysilane at low temperatures of about 1° C.; at these temperatures capric acid has limited solubility in vinyltrimethoxysilane, see Example 2 below. The partial precipitation that occurs in Example 2D leads to separation within the product packaging—usually drums or an IBC (Intermediate Bulk Container). In order to prevent this separation and ensure homogeneity of the mixture, the contents of the packaging would have to be stirred continuously during processing of the silane mixtures; this is an additional, not inconsiderable cost, in relation to capital expenditure and energy consumption which is unacceptable in the industrial Monosil process. In contrast to this, a mixture of 60% by weight of 2-ethylhexanoic acid and 40% by weight of vinyltrimethoxysilane remains a clear solution even after 18 hours at 1° C., see Example 3.

It was moreover surprisingly found that the solubility of 2-ethylhexanoic acid is considerably better than that of caprylic acid; this applies not only in solutions only using unsaturated alkoxysilanes, see Example 3 below, but also in present compositions after storage at very low temperatures (18 hours at 1° C.), see Example 4.

Present compositions comprising content of monounsaturated organotrialkoxysilane, in particular vinyltrimethoxysilane (VTMO), vinyltriethoxysilane (VTEO) and 3-methacryloxypropyltrimethoxysilane (MEMO) with high proportions of up to 60% by weight of 2-ethylhexanoic acid remain a single-phase clear liquid even at 6° C.

Compositions of the invention moreover feature excellent performance in the Monosil process and exceptional quality of resultant products.

On this basis it was advantageously possible to provide compositions with
(i) up to 60% by weight content of 2-ethylhexanoic acid [$H_3C(CH_2)_3CH(C_2H_5)COOH$],
(ii) content of at least one monounsaturated organofunctional alkoxysilane of the general formula I

$$A\text{-}SiR^2_x(OR^1)_{3-x} \qquad (I),$$

where
R¹ is mutually independently a linear or branched hydrocarbon moiety having from 1 to 4 C atoms,
R² is methyl and x is 0 or 1 and
A is a monovalent olefin group of the formula $(R^3)_2C=C(R^3)\text{-}M_k\text{-}$, where k is 0 or 1, in which groups R³ are identical or different and R³ is a hydrogen atom or a methyl group and the group M is a group from the following list: —CH₂—, —(CH₂)₂—, —(CH₂)₃— and —C(O)O—(CH₂)₃—,
(iii) content of at least one free-radical generator and
(iv) optionally content of at least one other component, where the entirety of all components (i) to (iv) gives 100% by weight.

Experiments in which compositions of the invention were used in the Monosil process for the production of tin-free products based on thermoplastic polyolefins have advantageously proved that it is now also possible to realize industrially significant metering quantities of tin-free silane preparations in the Monosil process. Particularly surprisingly, it has been found here that the quality and, respectively, processing properties of products based on thermoplastic polyolefins can be further markedly improved by using a silane preparation comprising 2-ethylhexanoic acid, when comparison is made to the corresponding composition or silane preparation of the type presented in an as yet unpublished parallel German Application, comprising caprylic acid. The use of 2-ethylhexanoic acid also permits adjustment of the proportion of catalyst component in the silane preparation to a lower level, in comparison with a preparation comprising caprylic acid, without impairment of the crosslinking properties required in the product.

The invention therefore provides a composition for use in a Monosil process for the crosslinking of thermoplastic polyolefins, which is characterized in that the composition comprises
(i) from 5 to 60% by weight content of 2-ethylhexanoic acid [$H_3C(CH_2)_3CH(C_2H_5)COOH$],
(ii) content of at least one monounsaturated organofunctional alkoxysilane of the general formula I

where
$R^1$ is mutually independently a linear or branched hydrocarbon moiety having from 1 to 4 C atoms,
$R^2$ is methyl and x is 0 or 1 and
A is a monovalent olefin group of the formula $(R^3)_2C=C(R^3)-M_k-$, where k is 0 or 1, in which groups $R^3$ are identical or different and $R^3$ is a hydrogen atom or a methyl group and the group M is a group from the following list: $—CH_2—$, $—(CH_2)_2—$, $—(CH_2)_3—$ and $—C(O)O—(CH_2)_3—$,
(iii) content of at least one free-radical generator and
(iv) optionally content of at least one other component, where the entirety of all components (i) to (iv) gives 100% by weight.

The content of 2-ethyl hexanoic acid [$H_3C(CH_2)_3CH(C_2H_5)COOH$] as component (i) in a composition of the invention is preferably from 9 to 55% by weight, particularly preferably from 15 to 45% by weight, in particular ≥20 to 40% by weight, inclusive of all values therebetween, and particular—but not exclusive—mention may be made here of 21, 22, 23, 24, 25, 26, 27, 28, 29, 30, 31, 32, 33, 34, 35, 36, 37, 38 and 39% by weight—to mention just a few values.

The content of component (ii) in a composition of the invention is moreover preferably from 15 to 94.95% by weight. To this end, from the group of the unsaturated organofunctional alkoxysilanes of the general formula I it is preferable to select vinyltrimethoxysilane, vinyltriethoxysilane or 3-methacryloxytrimethoxysilane as component (ii).

The free-radical generator as component (iii) in a composition of the invention is suitably an organic peroxide and/or an organic perester, being advantageously selected from the following list: tert-butyl peroxypivalate, tert-butyl 2-ethylperoxyhexanoate, dicumyl peroxide, di-tert-butyl peroxide, tert-butyl cumyl peroxide, di(tert-butylperoxyisopropyl)benzene, 1,3-di(2-tert-butylperoxyisopropyl)benzene, 1,4-di(2-tert-butylperoxyisopropyl)benzene, 2,5-dimethyl-2,5-bis(tert-butylperoxy)hex-3-yne, di-tert-amyl peroxide, 1,3,5-tris(2-tert-butylperoxy-isopropyl)benzene, 1-phenyl-1-tert-butylperoxyphthalide, alpha,alpha'-bis(tert-butylperoxy)diisopropylbenzene, 2,5-dimethyl-2,5-di-tert-butylperoxyhexane, 1,1-di(tert-butylperoxy)-3,3,5-trimethylcyclohexane, n-butyl 4,4-di(tert-butylperoxy)valerate, ethyl 3,3-di(tert-butylperoxy)butyrate, 3,3,6,9,9-hexamethyl-1,2,4,5-tetraoxacyclononane or a mixture of at least two of the abovementioned free-radical generators.

It is preferable that the content of component (iii) in a composition of the invention is from 0.05 to 10% by weight, particularly from 1 to 9% by weight.

The composition of the invention can moreover comprise, as component (iv), at least one additional substance and/or a mixture of these.

Component (iv) in a composition of the invention is therefore by way of example—but not exclusively—at least one additional substance from the following list: pentaerythrityl tetrakis[3-(3,5-bis(1,1-dimethylethyl)-4-hydroxyphenyl)propionate], 2,6-di-tert-butyl-4-methylphenol, octadecyl 3-(3,5-di-tert-butyl-4-hydroxyphenyl)propionate, 4,4'-bis(1,1-dimethylbenzyl)diphenylamine, N,N'-bis(3-(3,5-di-tert-butyl-4-hydroxyphenyl)propionyl)hydrazine, 6,6'-di-tert-butyl-2,2'-thiodi-p-cresol, 1,3,5-trimethyl-2,4,6-tris(3,5-di-tert-butyl-4-hydroxybenzyl)benzene, tris(2-tert-butyl-4-thio(2'-methyl-4-hydroxy-5'-tert-butyl)phenyl-5-methyl) phenyl phosphite and 2,2,4-trimethyl-1,2-dihydroquinoline (polymerized).

The composition of the invention is generally used in liquid form. However, in some cases it is also advantageous—for still easier metering—to provide a composition of the invention on a solid carrier in a solid, flowable formulation, for example on an organic or inorganic carrier material. The carrier can be porous, particulate, swellable or optionally a foam. Particularly suitable carrier materials are polyolefins, such as PE, PP or polymer blends or inorganic or mineral materials, which can also advantageously have reinforcing, extending or flame-retardant properties. The carrier material can therefore also be at least one filler of the type conventionally used for filled thermoplastic polyolefin products, these being specified in more detail in the following: by way of example titanium dioxide ($TiO_2$), talc powder, clay, quartz, kaolin, aluminium hydroxide, magnesium hydroxide, bentonite, montmorillonite, mica (muscovite mica), calcium carbonate (chalk, dolomite), dyes, pigments, carbon black, $SiO_2$, precipitated silica, fumed silica, aluminium oxides, such as alpha- and/or gamma-aluminium oxide, aluminium oxide hydroxides, boehmite, baryte, barium sulphate, lime, silicates, aluminates, aluminium silicates and/or ZnO or a mixture of these.

Specific preferred carrier materials that may be mentioned are: ATH (aluminium trihydroxide, $Al(OH)_3$), magnesium hydroxide ($Mg(OH)_2$) or fumed silica, which is produced on an industrial scale by continuous hydrolysis of silicon tetrachloride in a hydrogen/oxygen flame. Fumed silica is an amorphous form of silicone dioxide which is a loose-textured, bluish powder. Particle size is usually in the region of a few nanometers, specific surface area is therefore large and is generally from 50 to 600 m$^2$/g. The uptake of the liquid composition of the invention here is in essence based on adsorption. Precipitated silicas are generally produced from sodium waterglass solutions by neutralization with inorganic acids under controlled conditions. After removal of the liquid phase, washing and drying, the crude product is finely ground, e.g. in steam-jet mills. Precipitated silica, too, is a substantially amorphous silicon dioxide, generally with a specific surface area of from 50 to 150 m$^2$/g. Calcium silicate is generally produced industrially by fusing quartz or kieselguhr with calcium carbonate or calcium oxide or by precipitation of aqueous sodium metasilicate solutions with water-soluble calcium compounds. The carefully dried product is generally porous and is capable of uptake of up to five times its quantity by weight of water or oils. The various commercially available forms of carbon black are equally suitable as carrier material, for example for the production of black cable sheathing.

Inorganic carrier materials suitably have a certain porosity, for example about 10% by volume. Uptake of a composition of the invention can therefore be achieved not only by surface adsorption but also by absorption within the pores.

Porous polyolefins, such as polyethylene (PE) or polypropylene (PP) and copolymers, such as ethylene copolymers with low-carbon alkenes, such as propene, butene, hexene, octene or ethylene vinyl acetate (EVA), are produced by specific polymerization techniques and polymerization processes. Particle sizes are generally from 3 to <1 mm, and porosity can be above 50% by volume.

Solid carrier materials can bear, on their surfaces, groups which can react with the alkoxy groups of the unsaturated organosilane/organosilane mixtures. A possible result here is that the silicon atom with the functional group bonded thereto becomes chemically fixed on the surface. These groups on the surface of the filler are in particular hydroxy groups. Accordingly, preferred fillers are metal hydroxides having a stoichiometric proportion, or, in their various dehydration stages, a substoichiometric proportion, of hydroxy groups, extending as far as oxides having comparatively few residual hydroxy groups, where these groups however are detectable by DRIFT IR spectroscopy. Examples of suitable fillers are aluminium trihydroxide (ATH), aluminium oxide hydroxide (AlOOH.aq), magnesium dihydroxide (MDH), brucite, huntite, hydromagnesite, mica and montmorillonite. Other fillers that can be used are calcium carbonate, talc powder and glass fibres. It is moreover possible to use what are known as "char formers", such as ammonium polyphosphate, stannates, borates, talc, or materials of this type in combination with other fillers. It is preferable that the said carrier materials or the said fillers are pulverulent, particulate, porous, or swellable or optionally are foams.

Particularly preferred carrier materials are therefore porous polyolefins, such as PE, PP, or polymer blends, porous aluminium hydroxides, magnesium hydroxides, fumed silica, precipitated silica and porous silicates.

In accordance with other preferred embodiments, a composition for the purposes of the present invention can also therefore comprise a selection of components (i), (ii) and (iii) and at least one other component (iv) selected from the following list: additional substances, such as antioxidants, stabilizers, such as metal deactivators and UV stabilizers, and other processing aids or processing substances and/or mixtures of these.

In one particularly preferred embodiment, a composition of the invention comprises
(i) from 9 to 40% by weight of 2-ethylhexanoic acid,
(ii) from 15 to 88% by weight of vinyltrimethoxysilane (VTMO) or vinyltriethoxysilane (VTEO) or 3-methacryloxypropyltrimethoxysilane (MEMO),
(iii) from 3 to 10% by weight of dicumyl peroxide and
(iv) optionally a total of from 0.05 to 15% by weight of at least one additional substance or of a plurality of additional substances,
where the entirety of all components (i) to (iv) gives 100% by weight.

A composition of the invention can therefore advantageously comprise, as further component (iv), from 0 to 15% by weight of a metal deactivator or stabilizer from the following list: pentaerythrityl tetrakis[3-(3,5-bis(1,1-dimethylethyl)-4-hydroxyphenyl)propionate], 2,6-di-tert-butyl-4-methylphenol, octadecyl 3-(3,5-di-tert-butyl-4-hydroxyphenyl)propionate, 4,4'-bis(1,1-dimethylbenzyl)diphenylamine, N,N'-bis(3-(3,5-di-tert-butyl-4-hydroxyphenyl)propionyl)-hydrazine, 6,6'-di-tert-butyl-2,2'-thiodi-p-cresol, 1,3,5-trimethyl-2,4,6-tris(3,5-di-tert-butyl-4-hydroxybenzyl)benzene, tris(2-tert-butyl-4-thio(2'-methyl-4-hydroxy-5'-tert-butyl)phenyl-5-methyl)phenyl phosphite and 2,2,4-trimethyl-1,2-dihydroquinoline (polymerized), where the entirety of all components (i) to (iv) gives 100% by weight.

Furthermore, a said composition of the invention can also be provided on a carrier (another term used for which above and hereinafter being carrier material), where the proportion of the composition of the invention, based on the carrier, can advantageously be from 10 to 50% by weight and the carrier is selected from the following list: thermoplastic polyolefins and inorganic carrier materials as mentioned above.

A composition of the invention can suitably be produced by weighing-out of components (i) to (iii) and optionally (iv), to the extent that component (iv) is entirely soluble in the preparation made of components (i), (ii) and (iii), charging these to a suitably inert stirred tank, and preferably mixing at room temperature. A list—which is not, however, exclusive—of the examples of materials of which containers, stirrers and articles in contact with the mixture can be made is as follows: quartz glass, enamelled steel or peroxide-resistant steel or plastic. Compositions of the invention thus obtained are generally homogeneous clear single-phase mobile liquids.

However, a composition of the invention thus obtainable in a simple and economic manner can also be applied to a carrier material or absorbed into a porous, absorbent carrier material, for example by immersion or impregnation: once the saturated carrier has been drip-dried, for example by way of a sieve, the composition of the invention can also be provided in a homogeneous flowable and easily weighable and easily meterable solid form on a carrier. Compositions of the invention are advantageously suitable for use in a Monosil process with thermoplastic polyolefins.

The present invention therefore also provides a process for the production of products based on thermoplastic polyolefins, by reacting a composition of the invention together with at least one thermoplastic polyolefin in a Monosil process.

In a suitable method for carrying out the Monosil process of the invention, at least one thermoplastic polyolefin and one composition of the invention and also optionally other additions, are metered into a heated screw-based extruder, the molten mixture is heated therein, the melt is conveyed and extruded by way of a die, the extrudate is passed into a water bath for crosslinking and the extrudate is permitted to react until dimensional stability is achieved and then the resultant moulding is dried.

Preferred thermoplastic polyolefins for the purpose of the invention are polyethylene (PE) and polypropylene (PP), in particular the following grades: LLPE, LDPE, LLDPE, VLDPE, MDPE, HDPE, m-PE and mixtures of at least two of the abovementioned polyolefins.

It is therefore possible to use the Monosil process of the invention to achieve advantageous production of the following in the form of mouldings or items that are free from tin, with high quality: power cables for the low-voltage and medium-voltage sector, cables for the solar-energy sector, flame-retardant thermoplastic and crosslinked cables, cables for underwater applications, safety cables for the mining sector, and in the transport sector (e.g. tramway systems, underground railway systems, airports), marine cables, cables in the oil-production sector or in the mining sector, automobile cables, and (tele)communication cables. The process of the invention can also be used advantageously for peripheral applications, for example shrink sleeves for cable installation.

The present invention therefore likewise provides mouldings or products, in particular cables, obtainable by the process of the invention.

The present invention further provides the use of a composition of the invention in a Monosil process for the crosslinking of thermoplastic polyolefins during the production of products moulded by means of extrusion based on thermoplastic polyolefins, in particular abovementioned cables, where these can be unfilled products or products filled with fillers and/or products coloured by means of dyes or by means of pigments.

Among all of the organic acids known in the prior art it is therefore clearly advantageous to select specifically 2-ethylhexanoic acid [$H_3C(CH_2)_3CH(C_2H_5)COOH$] as hydrolysis and crosslinking catalyst in "silane preparations" or in compositions of the invention for use in the Monosil process for the provision of tin-free products based on thermoplastic polyolefins, in particular for cable applications, where products thus obtained very particularly feature comparatively high surface quality together with crosslinking properties that comply with standards.

EXAMPLES

The examples below illustrate the present invention without restricting the subject matter:

Definitions

Carboxylic Aids
Caprylic acid=octanoic acid, $H_3C(CH_2)_6COOH$
Capric acid=decanoic acid, $H_3C(CH_2)_8COOH$
Lauric acid=dodecanoic acid, $H_3C(CH_2)_{10}COOH$
Myristic acid=tetradecanoic acid, $H_3C(CH_2)_{12}COOH$
2-Ethylhexanoic acid=$H_3C(CH_2)_3CH(C_2H_5)COOH$
pts=Parts This unit always means the proportion (parts by weight) of the respective additive, based on 100 pts of polymer—in this study by way of example polyethylene (PE). By way of example, 1.4 pts of a silane mixture are added to 100 pts of PE. After conversion to percent this then gives:

1.4 pts of silane mixture/(100 pts of PE+1.4 pts of silane mixture)×100=1.38% of silane mixture in the entire compounded polymer material.

h=Hour(s)
% by wt.=Percent by Weight
Roller-Bed Application

In this process, plastics granulate is charged after heating—for 1 h at 70° C. in a convection oven—to a round-bottomed plastic flask. The silane mixture needed for the experiment is then added onto the heated plastics granulate, and the flask is placed on a roller bed. The round-bottomed flask is then rotated around its longitudinal axis for 1 h, and the entire content of the plastics flask is thus mixed. The heated plastic absorbs the silane mixture, and after 1 h the result is a dry flowable plastics granulate which comprises the silane mixture in the necessary or planned ratio.

Tensile Specimen/Test Specimen/Sample for Testing/Test Sample

This is a sample for testing which is punched out by means of a punching apparatus from an extruded strip (moulding). The selected shape of the tensile specimen for testing is such that the width of the specimen is considerably greater at the external ends than in the narrowed central portion. This permits defined loading in the central portion of the specimen in order to ensure that the measurements are reproducible. The hot-set/permanent-set measurement markings are applied in said central, narrowed region. Calculation of the required loading weight uses the cross-sectional area (width×thickness) on the narrowed central portion, since maximal loading occurs here. The test samples used in experiments were of type 5A, in accordance with DIN EN ISO 527-2:2012-06, page 10.

Hot Set

In a drying cabinet with natural ventilation, a tensile specimen is exposed to defined mechanical loading (0.2 MPa, 15 min at 200° C.), and the resultant change in length of the test specimen is determined. The loading weight required for a rectangular tensile-specimen cross section and for a prescribed loading of 0.2 MPa is calculated as follows: loading weight [g]=20.387×tensile-specimen width [mm]× tensile-specimen thickness [mm] (width and thickness being measured in each case in the narrowed region of the tensile specimen).

The calculated weight is suspended on the appropriate test specimen, and the entire arrangement is fixed in the convection oven at 200° C. The test specimen is previously marked with two markings (20 mm apart). After 15 minutes, the distance between the marks is measured. The hot set here is the thermal expansion of the loaded tensile specimens after 15 minutes at 200° C. with a loading of 0.2 MPa. The hot set is calculated in the following way:

$$\text{hot set}=(L_{HS}-20\text{ mm})/20\text{ mm}*100[\%].$$

$L_{HS}$ here is the distance between the markings in mm after the 15 min at 200° C. with loading of 0.2 MPa. Hot set values ≤100% correspond to adequately good crosslinking.

Permanent Set

After determination of the change in distance between the markings on the loaded specimen after 15 minutes at 200° C. with loading of 0.2 MPa in the drying oven, i.e. directly after the determination of hot set, the weights are removed from the tensile specimens, and the tensile specimens are retained for a further 5 minutes in the oven at 200° C. with no loading. After five minutes, the tensile specimens are removed and are allowed to cool for 5 minutes at ambient temperature. The distance between the markings is then again measured. The permanent set is the residual expansion indicated by the marking on the crosslinked tensile specimens. The permanent set is calculated in the following way:

$$\text{Permanent set}=(L_{PS}-20\text{ mm})/20\text{ mm}*100.$$

$L_{PS}$ here is the distance between the markings on the tensile specimen after the test specimen had been retained for 5 minutes at 200° C., with no loading, and finally then had been cooled at RT for 5 min. Permanent set values ≤25% correspond to adequately good crosslinking.

Example 1 Comparative Example

Solution Experiment with Myristic Acid in Vinyltrimethoxysilane:

50 g of vinyltrimethoxysilane (VTMO) were used as initial charge in a clear 100 ml glass flask. The myristic acid was then added stepwise to the silane, and the flask was shaken manually until a clear liquid was obtained. The silane composition was then stored at +6° C. in a refrigerator and removed from time to time for inspection. Table 1 lists the details and the results.

TABLE 1

Solution study using myristic acid in vinyltrimethoxysilane

| | Example 1A<br>Myristic acid<br>in 50.08 g of VTMO |
|---|---|
| Addition 1 at room temperature: about 26° C. | Quantity added 3.5 g, clear liquid, vigorous shaking required |
| Addition 2 at room temperature about 26° C. | Further quantity added 0.29 g, clear liquid, vigorous shaking required |
| Overnight in chamber under controlled conditions at about 23° C. | The flask was stored for 17.1 hours in a chamber under controlled conditions at about 23° C. The specimens then still had the same clarity. |
| Addition 3 - Chamber under controlled conditions; about 23° C. | Further quantity added 0.5 g, clear liquid, vigorous shaking required |
| In refrigerator at about 6° C. | Severe precipitation after 50 minutes |
| Percentage proportion of catalyst component in VTMO | 7.8% by weight |

Result of Example 1

After as little as 50 minutes at 6° C., much of the myristic acid in the silane mixture precipitates. It is therefore not possible to obtain a stable silane mixture with ≥7.8% by weight of myristic acid which withstands the actual ambient conditions.

Example 2 Comparative Example

Solution Studies Using Capric Acid in Vinyltrimethoxysilane

Mixtures of vinyltrimethoxysilane and capric acid in various ratios were prepared. The mixtures were produced in 20 ml clear glass flasks. Mixing was continued until a stable solution was obtained. The flasks were then stored at 1° C. and the liquids were assessed after 2 h, 3.5 h, and 18 h.

TABLE 2

Results of mixture studies using capric acid in vinyltrimethoxysilane

| Starting materials | Example 2A | | Example 2B | | Example 2C | | Example 2D | |
|---|---|---|---|---|---|---|---|---|
| Vinyltrimethoxysilane (VTMO) | 9 g | 90% by wt. | 8.5 g | 85% by wt. | 8 g | 80% by wt. | 7.5 g | 75% by wt. |
| Capric acid | 1 g | 10% by wt. | 1.5 g | 15% by wt. | 2 g | 20% by wt. | 2.5 g | 25% by wt. |
| After 2 h at 1° C. | Clear solution | | Clear solution | | Clear solution | | Precipitate, redissolves at room temperature | |
| After 3.5 h at 1° C. | Clear solution | | Clear solution | | Clear solution | | Precipitate, redissolves at room temperature | |
| After 18 h at 1° C. | Clear solution | | Clear solution | | Precipitate, redissolves at room temperature | | Precipitate, redissolves at room temperature | |

Result of Example 2

Again, capric acid does not permit production of VTMO solutions with relatively high catalyst or acid content which are also stable when stored at a low temperature.

Example 3

Solution Experiments Using Caprylic Acid and 2-Ethylhexanoic Acid in Unsaturated Alkoxysilanes In each case, 4 g of an unsaturated alkoxysilane-vinyltrimethoxysilane (VTMO), vinyltriethoxysilane (VTEO), 3-methacryloxypropyltrimethoxysilane (MEMO)—was charged with 6 g of carboxylic acid (caprylic acid and 2-ethylhexanoic acid) to a 20 ml clear glass flask, and mixed by shaking. The flasks were then stored at 1° C., and after 18 h the liquids were assessed. Tables 3-1 and 3-2 present the results.

TABLE 3-1

Overview of results of solution studies using 60% by weight of caprylic acid in various unsaturated alkoxysilanes

| Starting materials | Example 3A | | Example 3B | | Example 3C | |
|---|---|---|---|---|---|---|
| Vinyltrimethoxysilane (VTMO) | 4 g | 40% by wt. | — | — | — | — |
| Vinyltriethoxysilane (VTEO) | — | — | 4 g | 40% by wt. | — | — |
| 3-Methacryloxypropyl-trimethoxysilane (MEMO) | — | — | — | — | 4 g | 40% by wt. |
| Caprylic acid | 6 g | 60% by wt. | 6 g | 60% by wt. | 4 g | 60% by wt. |
| At room temperature | Clear solution | | Clear solution | | Clear solution | |
| After 18 h at 1° C. | Clear solution | | Clear solution | | Some solid, redissolves completely at room temperature | |

TABLE 3-2

Overview of results of solution studies using 60% by weight of 2-ethylhexanoic acid in various unsaturated alkoxysilanes

| Starting materials | Example 3D | | Example 3E | | Example 3F | |
|---|---|---|---|---|---|---|
| Vinyltrimethoxysilane (VTMO) | 4 g | 40% by wt. | — | — | — | — |
| Vinyltriethoxysilane (VTEO) | — | — | 4 g | 40% by wt. | — | — |

TABLE 3-2-continued

Overview of results of solution studies using 60% by weight of 2-ethylhexanoic acid in various unsaturated alkoxysilanes

| Starting materials | Example 3D | | Example 3E | | Example 3F | |
|---|---|---|---|---|---|---|
| 3-Methacryloxypropyl-trimethoxysilane (MEMO) | — | — | — | — | 4 g | 40% by wt. |
| 2-Ethylhexanoic acid | 6 g | 60% by wt. | 6 g | 60% by wt. | 4 g | 60% by wt. |
| At room temperature | Clear solution | | Clear solution | | Clear solution | |
| After 18 h at 1° C. | Clear solution | | Clear solution | | Clear solution | |

Result of Example 3

Surprisingly, it has been found that all of the mixtures with 2-ethylhexanoic acid remain clear solutions even after 18 h at 1° C., even at a proportion of 60% by weight, in all of the silanes investigated (VTMO, VTEO, MEMO). In the case of the combination with 40% by weight of acid and MEMO+60% by weight of caprylic acid, the solution properties of 2-ethylhexanoic acid are found to be better even than those of caprylic acid.

Example 4

Solution Studies Using Mixtures with Various Unsaturated Alkoxysilanes, Peroxides, Additives and Carboxylic Acids—Comparison of Caprylic Acid with 2-Ethylhexanoic Acid Silane mixtures with various additives were produced in 20 ml clear glass flasks. The starting materials were mixed (magnetic stirrer, about 1 h at room temperature) until a stable solution was obtained. The flasks were then stored at 1° C., and after 3.5 h the liquids were assessed. The mixtures and the associated results are listed in Table 4-1 (experiments with caprylic acid) and Table 4-2 (experiments with 2-ethylhexanoic acid).

TABLE 4-1

Mixtures with various unsaturated alkoxysilanes, peroxides, additives and caprylic acid

| Starting materials | Example 4A | | Example 4B | | Example 4C | |
|---|---|---|---|---|---|---|
| Vinyltrimethoxysilane (VTMO) | 5 g | 50% | — | — | — | — |
| Vinyltriethoxysilane (VTEO) | — | — | 1.5 g | 15% | — | — |
| 3-Methacryloxypropyltrimethoxysilane (MEMO) | — | — | — | — | 4.5 g | 45% |
| Dicumyl peroxide | 1 g | 10% | — | — | — | — |
| 2,5-Dimethyl-2,5-di(tert-butylperoxy)-hexane | — | — | — | — | 1 g | 10% |
| Di(tert-butylperoxyisopropyl)benzene | — | — | 1 g | 10% | — | — |
| 2,6-Di-tert-butyl-4-methylphenol | 1.5 | 15% | — | — | — | — |
| Pentaerythrityl tetrakis[3-(3,5-bis(1,1-dimethylethyl)-4-hydroxyphenyl)-propionate] | — | — | — | — | 0.25 g | 2.5% |
| 4,4-Bis(1,1-dimethylbenzyl)diphenyl-amine | — | — | — | — | 0.5 g | 5% |
| Tris(2-tert-butyl-4-thio(2'-methyl-4-hydroxy-5'-tert-butyl)phenyl-5-methyl)phenyl phosphite | — | — | — | — | 0.25 g | 2.5% |
| 2,2,4-Trimethyl-1,2-dihydroquinoline, polymerized (TMQ) | — | — | 1.5 g | 15% | — | — |
| Caprylic acid | 2.5 | 25% | 6 g | 60% | 3.5 g | 35% |
| Prior to storage | Clear solution | | Reddish brown solution | | Clear solution | |
| After 3.5 h at 1° C. | Clear solution | | Reddish brown solution | | Clear solution | |
| After 18 h at 1° C. | Clear solution | | Reddish brown "frozen" (solid) | | Clear solution | |

TABLE 4-2

Mixtures with various unsaturated alkoxysilanes, peroxides, additives and 2-ethyl-hexanoic acid

| Starting materials | Example 4D | | Example 4E | | Example 4F | |
|---|---|---|---|---|---|---|
| Vinyltrimethoxysilane (VTMO) | 5 g | 50% | — | — | — | — |
| Vinyltriethoxysilane (VTEO) | — | — | 1.5 g | 15% | — | — |
| 3-Methacryloxypropyltrimethoxysilane (MEMO) | — | — | — | — | 4.5 g | 45% |
| Dicumyl peroxide | 1 g | 10% | — | — | — | — |
| 2,5-Dimethyl-2,5-di(tert-butylperoxy)hexane | — | — | — | — | 1 g | 10% |
| Di(tert-butylperoxyisopropyl)benzene | — | — | 1 g | 10% | — | — |
| 2,6-Di-tert-butyl-4-methylphenol | 1.5 | 15% | — | — | — | — |
| Pentaerythrityl tetrakis[3-(3,5-bis(1,1-dimethylethyl)-4-hydroxyphenyl)propionate] | — | — | — | — | 0.25 g | 2.5% |
| 4,4-Bis-(1,1-dimethylbenzyl)diphenylamine | — | — | — | — | 0.5 g | 5% |
| Tris(2-tert-butyl-4-thio(2'-methyl-4-hydroxy-5'-tert-butyl)phenyl-5-methyl)phenyl phosphite | — | — | — | — | 0.25 g | 2.5% |
| 2,2,4-Trimethyl-1,2-dihydroquinoline, polymerized (TMQ) | — | — | 1.5 g | 15% | — | — |
| 2-Ethylhexanoic acid | 2.5 | 25% | 6 g | 60% | 3.5 g | 35% |
| Prior to storage | Clear solution | | Reddish brown solution | | Clear solution | |

TABLE 4-2-continued

Mixtures with various unsaturated alkoxysilanes, peroxides, additives and 2-ethyl-hexanoic acid

| Starting materials | Example 4D | Example 4E | Example 4F |
|---|---|---|---|
| After 3.5 h at 1° C. | Clear solution | Reddish brown solution | Clear solution |
| After 18 h at 1° C. | Clear solution | Reddish brown solution | Clear solution |

Result of Example 4

Surprisingly, when 2-ethylhexanoic acid is compared with caprylic acid it exhibits markedly better solution behaviour after 18 h at 1° C. Whereas in the case of caprylic acid the mixture 4B (Table 4-1) has "frozen" after 18 h at 1° C., the mixture with 2-ethylhexanoic acid (Example 4E, Table 4-2) remained in solution. Here again, therefore, 2-ethylhexanoic acid exhibits better solution properties than caprylic acid.

Example 5 Comparative Example

Silane Crosslinking of LLDPE with Myristic Acid and DBTL as Catalysts:

A heatable screw-based extruder was used to react LLDPE with silane preparations based on vinyltrimethoxysilane, dicumyl peroxide and a crosslinking catalyst, and the mixture was moulded and then crosslinked with exposure to moisture. Table 5-1 lists the two silane preparations.

TABLE 5-1

Silane composition for the extrusion study

| | Example 5A | Example 5B |
|---|---|---|
| Vinyltrimethoxysilane | 87.6% by wt. | 84.4% by wt. |
| Dicumyl peroxide | 7.9% by wt. | 7.6% by wt. |
| 2,6-Di-tert-butyl-4-methyl phenol | 1.0% by wt. | 1.0% by wt. |
| Dibutyltin dilaurate (DBTL) | 3.5% by wt. | — |
| Myristic acid | — | 7.0% by wt. |

The extrusion process was achieved in a twin-screw extruder (ZE25, Berstorff) with l/d ratio of 33 and with screw diameter d=25 mm. The silane compositions were applied to the polyethylene (LLDPE, LL 4004 EL, ExxonMobil Chemical) on a roller bed over a period of about 1 h. Prior to said application process, the PE had been heated for about 1 h at about 70° C. The temperature profile for the extrusion process was as follows, at a rotation rate of 100 rpm: –/150/160/200/200/210/210/210° C. A strip was extruded. The strips were crosslinked in a water bath at 80° C. for 6 h. Prior to measurement of hot set and of permanent set, the crosslinked test samples were dried for 1 h at 100° C. Table 5-2 lists the results of the extrusion processes.

TABLE 5-2

Results of crosslinking studies with myristic acid and DBTL as catalysts.

| | Hot set [%] 0.2 MPa, 15 min@200° C. | | Permanent set [%] 5 min@200° C., 5 min@RT | |
|---|---|---|---|---|
| | 1.4 pts | 1.6 pts | 1.4 pts | 1.6 pts |
| DBTL sample (Example 5A) | 48 | 38 | 5 | 0 |

TABLE 5-2-continued

Results of crosslinking studies with myristic acid and DBTL as catalysts.

| | Hot set [%] 0.2 MPa, 15 min@200° C. | | Permanent set [%] 5 min@200° C., 5 min@RT | |
|---|---|---|---|---|
| | 1.4 pts | 1.6 pts | 1.4 pts | 1.6 pts |
| Myristic acid sample (Example 5B) | fractured | fractured | — | — |

Result of Example 5

The proportion of 7% by weight of myristic acid in the silane mixture is not sufficient to achieve adequately good crosslinking density which corresponds to the prior art. Proportions markedly >7% by weight of myristic acid must be used in order to obtain acceptable degrees of crosslinking. The solubility limit of myristic acid in unsaturated alkoxysilanes (see Example 1) severely limits the formulation process. Use of myristic acid cannot therefore provide any practical solution to the technical problem.

Example 6

Silane Crosslinking of LLDPE with 2-Ethylhexanoic Acid as Catalyst in Comparison with Caprylic Acid as Catalyst A heatable screw-based extruder was used to react LLDPE with silane formulations based on vinyltrimethoxysilane, dicumyl peroxide and a crosslinking catalyst, and the mixtures were moulded and then crosslinked with exposure to moisture. The catalysts 2-ethylhexanoic acid and caprylic acid were tested in comparison with one another. Table 6-1 lists the silane preparations tested.

TABLE 6-1

Silane preparations for the crosslinking experiments in the Monosil process - caprylic acid and 2-ethylhexanoic acid as crosslinking catalysts

| Starting materials | Example 6A 9.1% by wt. of 2-ethylhexanoic acid | Example 6B 25% by wt. of caprylic acid (Comparative Example) | Example 6C 25% by wt. of 2-ethylhexanoic acid |
|---|---|---|---|
| Vinyltrimethoxysilane | 82.8% by wt. | 68.2% by wt. | 68.2% by wt. |
| 2,6-Di-tert-butyl-4-methylphenol | 0.9% by wt. | 0.4% by wt. | 0.4% by wt. |
| Dicumyl peroxide | 7.2% by wt. | 6.4% by wt. | 6.4% by wt. |
| Caprylic acid | — | 25% by wt. | — |
| 2-Ethylhexanoic acid | 9.1% by wt. | — | 25% by wt. |

The extrusion process was achieved in a twin-screw extruder (ZE25, Berstorff) with l/d ratio of 33 and with screw diameter d=25 mm. The silane mixtures were applied to the polyethylene (LLDPE, LL 4004 EL, ExxonMobil Chemical) on a roller bed over a period of about 1 h. Prior to said application process, the PE had been heated for about 1 h at about 70° C. The temperature profile for the extrusion process was as follows, at a rotation rate of 100 rpm: –/150/160/200/200/210/210/210° C. A strip was extruded. The strips were crosslinked in a water bath at 80° C. for 6 h. Prior to measurement of hot set and of permanent set, the crosslinked test samples were dried for 1 h at 100° C. Table 6-2 lists the results of the extrusion processes.

TABLE 6-2

Results of the study of processing and crosslinking of LLDPE in the Monosil process with caprylic acid and 2-ethylhexanoic acid as crosslinking catalysts

| Quantity of silane mixture added | Example 6A 9.1% by wt. of 2-ethylhexanoic acid | Example 6B 25% by wt. of caprylic acid | Example 6C 25% by wt. of 2-ethylhexanoic acid |
|---|---|---|---|
| Head pressure (average values) during extrusion process [bar] | | | |
| 1.2 pts | 30 bar | Not extruded | 31 bar |
| 1.4 pts | 32 bar | Not extruded | 33 bar |
| 1.6 pts | 31 bar | 32 bar | 32 bar |
| 1.8 pts | 30 bar | 45 bar | 33 bar |
| 2.0 pts | 33 bar | 47 bar | 35 bar |
| Quality of strip (all mixtures) | Smooth surfaces | Poor-quality edges and corrugated | Smooth surfaces |
| Hot set (average values, 6 hz@80° C., H$_2$O) [%] | | | |
| 1.2 pts | not determinable | Not extruded | 143% |
| 1.4 pts | 185% | Not extruded | 95% |
| 1.6 pts | 97% | 85% | 71% |
| 1.8 pts | 73% | 82% | 75% |
| 2.0 pts | 70% | 68% | 73% |
| Permanent set (average values, 6 hz@80° C., H$_2$O) [%] | | | |
| 1.2 pts | not determinable | not extruded | 23% |
| 1.4 pts | 23% | not extruded | 15% |
| 1.6 pts | 12% | 21% | 8% |
| 1.8 pts | 10% | 15% | 10% |
| 2.0 pts | 8% | 13% | 10% |

Results of Example 6

It has been found that both caprylic acid and 2-ethylhexanoic acid can be used as tin-free catalysts. Surprisingly, however, it has been found during the extrusion process that all of the mixtures with 2-ethylhexanoic acid, irrespective of the quantity added, enable processing under conditions less detrimental to the product, in comparison with caprylic acid. This is very clearly apparent from the head pressures at the extruder outlet during the extrusion process. Whereas the range for all of the mixtures with 2-ethylhexanoic acid is from 30 to 35 bar, head pressure rises significantly in the case of the mixtures with caprylic acid to from 32 to 47 bar. The reason for these high pressures is increased melt viscosity. During the extrusion process for the mixtures with caprylic acid this also leads to unsatisfactory rough strips or products with poor-quality edges. All of the strips or products from the mixtures with 2-ethylhexanoic acid were of excellent quality, and also had very high degrees of crosslinking.

Increased head pressure means in practice a significantly higher loading on materials of tooling and of the final product, during the production process. As far as the tooling and production parts are concerned, this in turn means markedly higher wear and a markedly higher frequency/intensity of maintenance. As far as the extrudate surfaces are concerned, unacceptable, severe product defects occur more frequently. The high viscosity and, in the case of the caprylic acid mixtures, poorer extrudability also has a severe effect on extrusion rate, and thus directly influences productivity. In contrast thereto, production with the mixtures with 2-ethylhexanoic acid can proceed at markedly higher rates with high quality, and this advantageously enables very high productivity and product quality.

The invention claimed is:

1. A composition comprising:
(i) from 5 to 60% by weight content of 2-ethylhexanoic acid [H$_3$C(CH$_2$)$_3$CH(C$_2$H$_5$)COOH],
(ii) a monounsaturated organofunctional alkoxysilane of formula (I)

$$A\text{-}SiR^2_x(OR^1)_{3-x} \quad (I),$$

wherein
each $R^1$ is independently a linear or branched hydrocarbon moiety having from 1 to 4 C atoms,
$R^2$ is methyl,
x is 0 or 1, and
A is a monovalent olefin group of the formula $(R^3)_2C=C(R^3)\text{-}M_k\text{-}$, where k is 0 or 1, in which groups $R^3$ are identical or different and $R^3$ is a hydrogen atom or a methyl group and M is —CH$_2$—, —(CH$_2$)$_2$—, —(CH$_2$)$_3$— and —C(O)O—(CH$_2$)$_3$—,
(iii) a free-radical generator, and
(iv) optionally another component,
wherein a content of component (ii) is at least 20% by weight of the composition, and
wherein the entirety of all components (i) to (iv) gives 100% by weight.

2. The composition of claim 1, comprising 15 to 45% by weight of 2-ethylhexanoic acid.

3. The composition of claim 1, wherein a content of component (ii) is from 20 to 94.95% by weight.

4. The composition of claim 1, wherein a content of component (iii) is from 0.05 to 10% by weight.

5. The composition of claim 4, wherein the free-radical generator component (iii) is at least one organic peroxide and/or organic perester selected from the group consisting of tert-butyl peroxypivalate, tert-butyl 2-ethylperoxyhexanoate, dicumyl peroxide, di-tert-butyl peroxide, tert-butyl cumyl peroxide, di(tert-butylperoxyisopropyl)benzene, 1,3-di(2-tert-butylperoxyisopropyl)benzene, 1,4-di(2-tert-butylperoxyisopropyl)benzene, 2,5-dimethyl-2,5-bis(tert-butylperoxy)hex-3-yne, di-tert-amyl peroxide, 1,3,5-tris(2-tert-butylperoxyisopropyl)benzene, 1-phenyl-1-tert-butylperoxyphthalide, alpha,alpha'-bis(tert-butylperoxy)diisopropylbenzene, 2,5-dimethyl-2,5-di-tert-butylperoxyhexane, 1,1-di(tert-butylperoxy)-3,3,5-trimethylcyclohexane, n-butyl 4,4-di(tert-butylperoxy)valerate, ethyl 3,3-di(tert-butylperoxy)butyrate, and 3,3,6,9,9-hexamethyl-1,2,4,5-tetraoxacyclononane.

6. The composition of claim 1, comprising the other component (iv).

7. The composition of claim 1, comprising, as component (iv), at least one additional substance selected from the group consisting of pentaerythrityl tetrakis[3-(3,5-bis(1,1-dimethylethyl)-4-hydroxyphenyl)propionate], 2,6-di-tert-buty1-4-methylphenol, octadecyl 3-(3,5-di-tert-butyl-4-hydroxyphenyl)propionate, 4,4'-bis(1,1-dimethylbenzyl)diphenylamine, N,N'-bis(3-(3,5-di-tert-butyl-4-hydroxyphenyl)propionyl)hydrazine, 6,6'-di-tert-butyl-2,2'-thiodi-p-cresol, 1,3,5-trimethyl-2,4,6-tris(3,5-di-tert-butyl-4-hydroxybenzyl)benzene, tris(2-tert-butyl-4-thio(2'- methyl-4-hydroxy-5'-tert-butyl)phenyl-5-methyl)phenyl phosphite and 2,2,4-trimethyl-1,2-dihydroquinoline (polymerized).

8. The composition of claim 1, wherein component (ii) is at least one member selected from the group consisting of vinyltrimethoxysilane, vinyltriethoxysilane, and 3-methacryloxytrimethoxysilane.

9. The composition of claim 1, comprising:
(i) from 9 to 40% by weight of 2-ethylhexanoic acid [$H_3C(CH_2)_3CH(C_2H_5)COOH$],
(ii) from 20 to 88% by weight of vinyltrimethoxysilane or vinyltriethoxysilane or 3-methacryloxypropyltrimethoxysilane,
(iii) from 3 to 10% by weight of dicumyl peroxide and
(iv) optionally a total of from 0.05 to 15% by weight of an additional substance or of a plurality of additional substances,
where an entirety of all components (i) to (iv) is 100% by weight.

10. The composition of claim 1, comprising, as component (iv), from 0 to 10% by weight of a stabilizer or metal deactivator selected from the group consisting of pentaerythrityl tetrakis [3-(3,5-bis(1,1-dimethylethyl)-4-hydroxyphenyl)propionate], 2,6-di-tert-butyl-4-methylphenol, octadecyl 3-(3,5-di-tert-butyl-4-hydroxyphenyl)propionate, 4,4'-bis(1,1-dimethyl benzyl)diphenylamine, N,N'-bis(3-(3,5-di-tert-butyl-4-hydroxyphenyl)propionyl)hydrazine, 6,6'-di-tert-butyl-2,2-thiodi-p-cresol, 1,3,5-trimethyl-2,4,6-tris(3,5-di-tert-butyl-4-hydroxybenzyl)benzene, tris-(2-tert-butyl-4-thio(2'-methyl-4-hydroxy-5'-tert-butyl)phenyl-5-methyl)phenyl phosphite and 2,2,4-trimethyl-1,2-dihydroquinoline (polymerized).

11. A solid composition, which comprises:
the composition of claim 1, as a first component, and
a carrier, wherein
a quantity of the first component is from 10 to 50% by weight, based on a weight of the carrier, and the carrier material is a thermoplastic polyolefin or an inorganic carrier material.

12. A process for producing a thermoplastic polyolefin, comprising reacting the composition according to claim 1 together with at least one thermoplastic polyolefin in a Monosil process.

13. The process according to claim 12,
the thermoplastic polyolefin, the composition, and also optionally another additive, are metered into a heated screw-based extruder to obtain a molten mixture, the molten mixture is heated therein to obtain a melt, the melt is conveyed and extruded by way of a die to obtain an extrudate, the extrudate is passed into a water bath for crosslinking and the extrudate is permitted to react until dimensional stability is achieved and then the resultant molding is dried.

14. A molding obtained by the process of claim 13.

* * * * *